(12) United States Patent
Tamura

(10) Patent No.: US 8,250,042 B2
(45) Date of Patent: Aug. 21, 2012

(54) DATA PROCESSING APPARATUS AND DATA PROCESSING METHOD WITH CONVERSION OF ERROR INFORMATION

(75) Inventor: Makiya Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 12/464,003

(22) Filed: May 11, 2009

(65) Prior Publication Data

US 2009/0287722 A1    Nov. 19, 2009

(30) Foreign Application Priority Data

May 13, 2008   (JP) ................................. 2008-126402

(51) Int. Cl.
*G06F 11/07* (2006.01)
*G06F 17/30* (2006.01)

(52) U.S. Cl. ...................................................... 707/691

(58) Field of Classification Search .................. 707/687, 707/690, 691, 694, E17.044; 714/E11.025
See application file for complete search history.

(56) References Cited

U.S. PATENT DOCUMENTS

| | | | | |
|---|---|---|---|---|
| 5,889,955 | A * | 3/1999 | Shinozaki et al. | 709/224 |
| 6,314,476 | B1 * | 11/2001 | Ohara | 710/15 |
| 6,666,594 | B2 * | 12/2003 | Parry | 400/74 |
| 6,693,722 | B1 * | 2/2004 | Mixer, Jr. | 358/1.15 |
| 6,724,494 | B1 * | 4/2004 | Danknick | 358/1.14 |
| 7,148,987 | B2 * | 12/2006 | Nishio | 358/1.15 |
| 7,262,871 | B2 * | 8/2007 | Matsueda et al. | 358/1.14 |
| 7,711,808 | B2 * | 5/2010 | Parry | 709/224 |
| 7,769,808 | B2 * | 8/2010 | Ohno et al. | 709/203 |
| 7,895,361 | B2 * | 2/2011 | Nishio | 709/246 |
| 2002/0159393 | A1 * | 10/2002 | Smith et al. | 370/249 |
| 2004/0267808 | A1 * | 12/2004 | Matsushima | 707/104.1 |
| 2005/0219556 | A1 * | 10/2005 | Lee et al. | 358/1.1 |
| 2005/0219612 | A1 | 10/2005 | Nakagawa | |
| 2006/0080366 | A1 * | 4/2006 | Miyachi et al. | 707/200 |
| 2006/0195613 | A1 * | 8/2006 | Aizu et al. | 709/246 |
| 2006/0274367 | A1 * | 12/2006 | Yamamoto et al. | 358/1.15 |
| 2007/0005561 | A1 * | 1/2007 | Sakura et al. | 707/1 |
| 2008/0109643 | A1 * | 5/2008 | Nishida | 712/225 |
| 2008/0123135 | A1 * | 5/2008 | Inoue | 358/1.15 |
| 2009/0002772 | A1 * | 1/2009 | Tsuya | 358/404 |
| 2009/0292850 | A1 * | 11/2009 | Barrall et al. | 710/301 |

FOREIGN PATENT DOCUMENTS

JP        2005-284949 A    10/2005

* cited by examiner

*Primary Examiner* — John E Breene
*Assistant Examiner* — Evan Aspinwall
(74) *Attorney, Agent, or Firm* — Canon U.S.A., Inc., IP Division

(57) ABSTRACT

A data processing apparatus executes, in response to a processing execution instruction transmitted from an information terminal connected to the data processing apparatus via a network, processing in accordance with the processing execution instruction. The data processing apparatus includes a protocol determining unit configured to determine a protocol used in transmission of the processing execution instruction when an error is caused during execution of the processing, a converting unit configured to convert information on the error in accordance with the protocol determined by the protocol determining unit so that the information is compliant with the protocol, and a transmitting unit configured to transmit the information on the error converted by the converting unit to the information terminal that has transmitted the processing execution instruction using the protocol used in transmission of the processing execution instruction.

9 Claims, 15 Drawing Sheets

| FUNCTION FLOW ERROR CODE | | WEB DAV ERROR CODE |
|---|---|---|
| 0x0001 | (NUMBER OF ACTIVE FUNCTION FLOWS HAS REACHED UPPER LIMIT) | HTTP507 (INSUFFICIENT STORAGE) |
| 0x0002 | (NUMBER OF QUEUING DOCUMENTS HAS REACHED UPPER LIMIT) | HTTP507 (INSUFFICIENT STORAGE) |
| 0x0003 | (SIZE OF USED MEMORY HAS REACHED UPPER LIMIT) | HTTP507 (INSUFFICIENT STORAGE) |
| 0x0004 | (CPU USAGE RATE HAS REACHED UPPER LIMIT) | HTTP507 (INSUFFICIENT STORAGE) |
| 0x0005 | (JOB CANNOT BE GENERATED DUE TO LACK OF RESOURCES) | HTTP507 (INSUFFICIENT STORAGE) |
| 0x0006 | (JOB IS STARTED INVALIDLY) | HTTP400 (BAD REQUEST) |
| 0x0007 | (VERIFICATION OF USER ID AND PASSWORD HAS FAILED) | HTTP401 (UNAUTHORIZED) |
| 0x0008 | (PROCESSING IS NOT ACCEPTED) | HTTP507 (INSUFFICIENT STORAGE) |
| 0x0009 | (INVALID PARAMETER IS SPECIFIED) | HTTP400 (BAD REQUEST) |
| 0x0010 | (UNABLE TO ACCEPT PROCESSING) | HTTP507 (INSUFFICIENT STORAGE) |
| 0x0011 | (OVERFLOW IS CAUSED IN PROCESSING TARGET) | HTTP507 (INSUFFICIENT STORAGE) |
| 0x0012 | (FUNCTION FLOW IS CANCELED DUE TO REASON OF DEVICE) | HTTP507 (INSUFFICIENT STORAGE) |
| 0x0013 | (INVALID PROCESSING IS PERFORMED) | HTTP400 (BAD REQUEST) |
| 0x0014 | (SUFFICIENT INFORMATION IS NOT RETURNED THOUGH PROCESSING HAS SUCCEEDED) | N/A |
| ... | | ... |

1101     1102

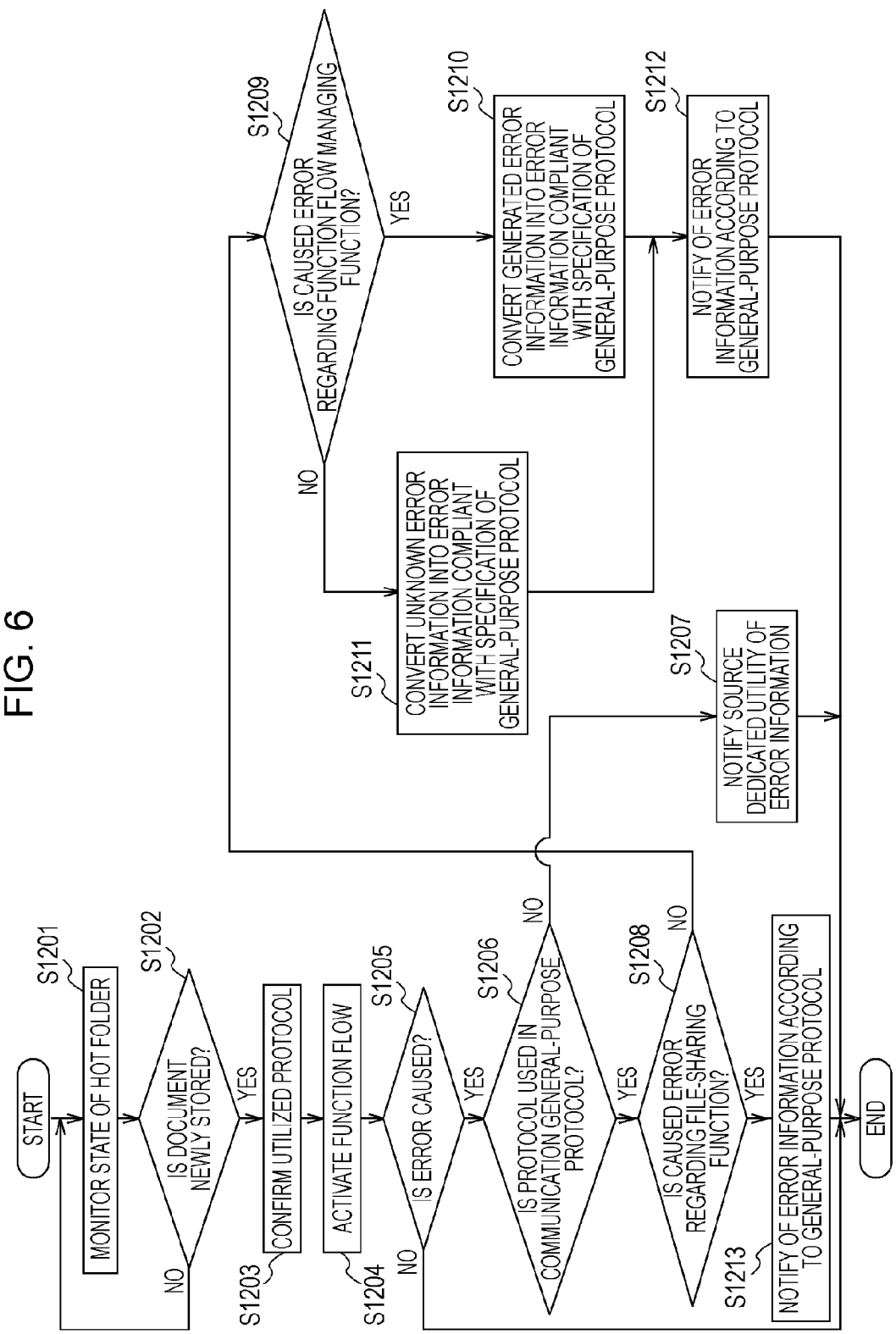

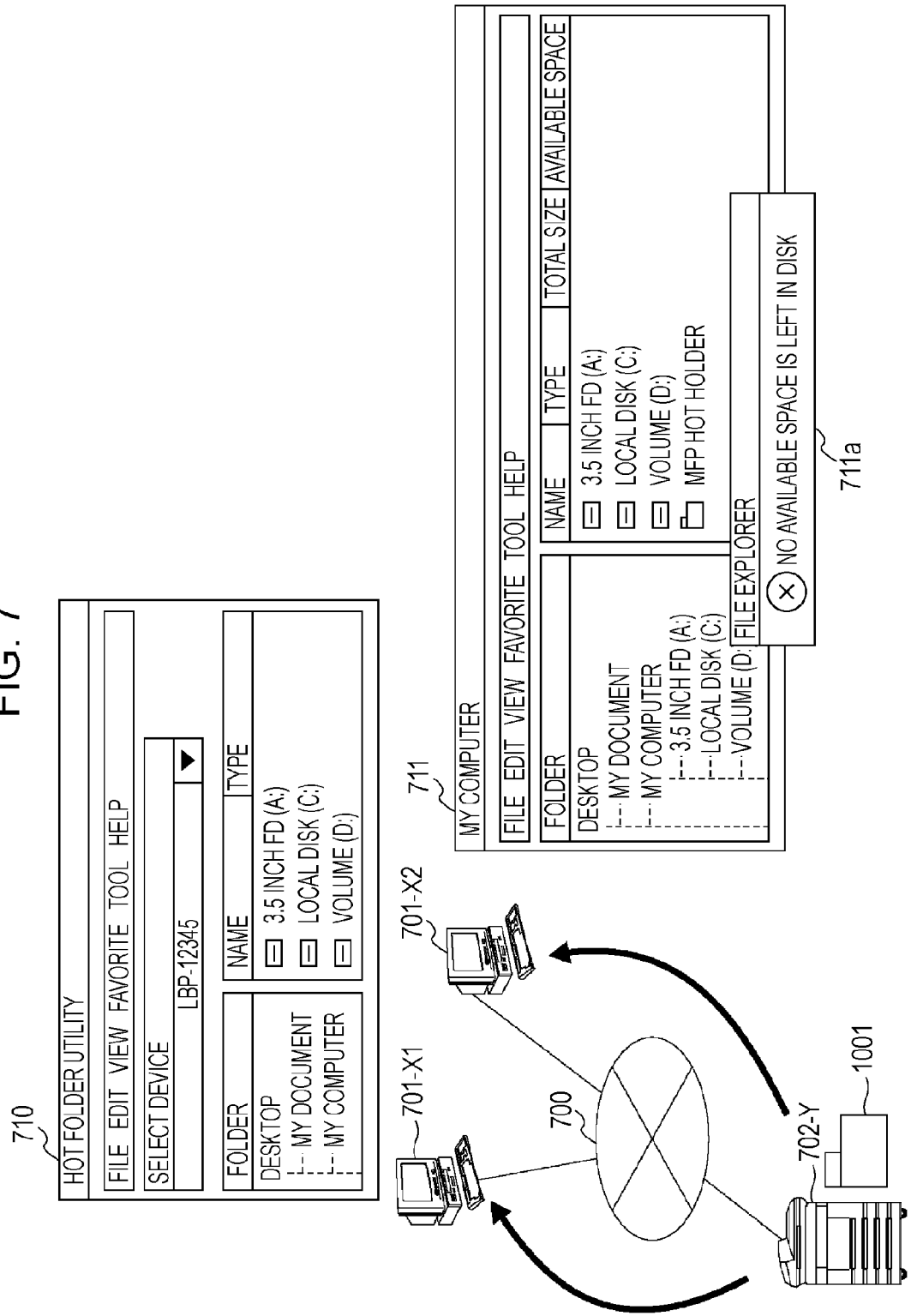

FIG. 13
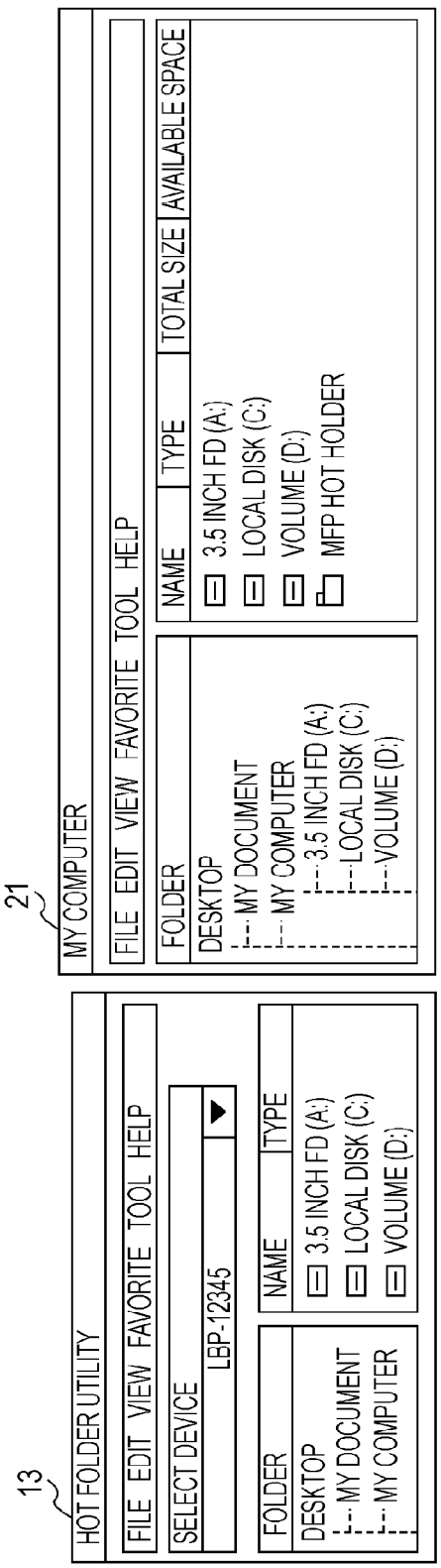
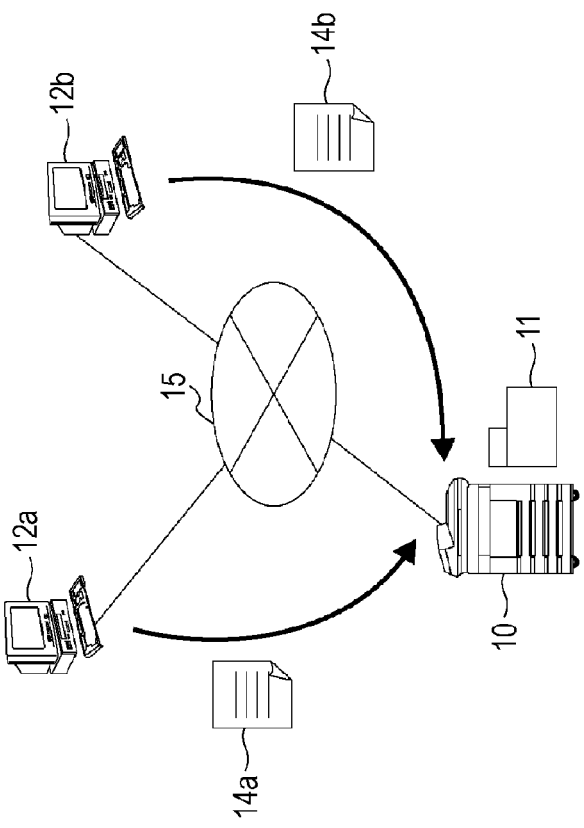

DATA PROCESSING APPARATUS AND DATA PROCESSING METHOD WITH CONVERSION OF ERROR INFORMATION

BACKGROUND OF THE INVENTION

1. Field of the Invention

The present invention relates generally to data processing apparatuses, data processing methods, and computer-readable recording media storing computer programs therefor, and, in particular, to a technique suitably used in notification of an error caused during a workflow that an external device is requested to execute.

2. Description of the Related Art

Digital multifunction peripherals (e.g., image processing apparatuses) including office equipment, such as a copier, a printer, an image scanner, and a facsimile machine, in a single housing, are frequently utilized at the offices of companies. Recent improvement in the processing capability of hardware, thanks to the progress of technology, allows the digital multifunction peripherals to provide various functions through software. For example, the digital multifunction peripherals may allow end users not only to separately execute each function, such as functions of a copier, a printer, an image scanner, a facsimile machine, and data storage, using the digital multifunction peripherals, but also to collectively execute a plurality of functions as a function flow. Here, the function flow indicates a workflow that is defined by combining functions of a copier, a printer, an image scanner, a facsimile machine, and data storage. By collectively executing individual functions of the digital multifunction peripherals in units of the function flow, it is possible to execute processing, which has been executed by a user separately operating each function, with one operation.

Recent digital multifunction peripherals have a network function for realizing connection to a network, such as a local area network (LAN) or a wide area network (WAN). The digital multifunction peripherals can realize various functions using the network function.

For example, a function allowing a digital multifunction peripheral to execute printing based on data transmitted to the digital multifunction peripheral from application software installed in a personal computer (hereinafter, abbreviated as a PC) via a network may be realized. Additionally, a function allowing a digital multifunction peripheral to transmit a facsimile based on data transmitted to the digital multifunction peripheral from a PC may be realized. A function allowing a digital multifunction peripheral to convert scanned document data into a file, such as a PDF, and to transmit the file as an email via a network may also be realized. Furthermore, a function allowing a digital multifunction peripheral to convert scanned document data into a file, such as a PDF, and to transmit the file to a file server connected thereto via a network and allowing the file server to store the file may be realized.

As described above, digital multifunction peripherals can realize various functions utilizing a network.

Processing for transmitting data to digital multifunction peripherals from PCs via a network is generally realized by utilizing dedicated utility software created according to a communication protocol unique to the digital multifunction peripherals. The dedicated utility software can use a dedicated protocol compliant with a communication protocol of the digital multifunction peripherals when data is transmitted between the PCs and the digital multifunction peripherals. The use of the dedicated communication protocol allows processing regarding functions unique to the digital multifunction peripherals to be executed. At this time, the digital multifunction peripherals can transmit a result of processing executed in response to reception of the data to the dedicated utility software using the dedicated communication protocol. Accordingly, the dedicated utility software can appropriately receive information regarding the processing result from the digital multifunction peripherals and can inform users of the appropriate information.

On the other hand, when the dedicated utility software is not installed in a PC, the PC may be unable to inform users of the appropriate information. Japanese Patent Laid-Open No. 2005-284949 thus proposes the following technique.

A PC first transmits data to a printer server utilizing the line printer daemon (LPD) protocol defined by RFC 1179. The printer server then processes the received data. If an error, such as a warning, is caused as a result of the data processing, the printer server determines whether dedicated utility software is installed in the PC that has transmitted the data. If the determination result indicates that the dedicated utility software is installed in the PC that has transmitted the data, the printer server notifies the dedicated utility software of the error, such as via a warning. On the other hand, if the dedicated utility software is not installed in the PC that has transmitted the data, the printer server notifies a message service provided by Windows 2000/XP of the error, such as via a warning. As described above, the technique disclosed in Japanese Patent Laid-Open No. 2005-284949 allows the PC not having the dedicated utility software to notify users of appropriate information if the PC can utilize a message service provided by an operating system (OS).

SUMMARY OF THE INVENTION

According to an aspect of the present invention, a data processing apparatus is provided for executing, in response to a processing execution instruction transmitted from an information terminal connected to the data processing apparatus via a network, processing in accordance with the processing execution instruction. The data processing apparatus includes a protocol determining unit configured to determine a protocol used in transmission of the processing execution instruction when an error is caused during execution of the processing, a converting unit configured to convert information on the error in accordance with the protocol determined by the protocol determining unit so that the information is compliant with the protocol, and a transmitting unit configured to transmit the information on the error converted by the converting unit to the information terminal that has transmitted the processing execution instruction using the protocol used in transmission of the processing execution instruction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain principles of the invention.

FIG. 5 is a diagram conceptually showing an example of a data configuration of a message conversion database (DB) according to a first exemplary embodiment of the present invention.

FIG. 6 is a flowchart illustrating an example of processing executed by a digital multifunction peripheral according to a first exemplary embodiment of the present invention.

FIG. 7 is a diagram conceptually showing an example of a process of notifying error information in a network system according to a first exemplary embodiment of the present invention.

FIG. 13 is a diagram conceptually showing an example process of storing a file in a hot folder using a general-purpose protocol.

DESCRIPTION OF THE EMBODIMENTS

Exemplary embodiments of the present invention will now be described in detail in accordance with the accompanying drawings.

A network function of a digital multifunction peripheral (e.g., image processing apparatus) can realize not only exchange of data between a PC and the digital multifunction peripheral via a network utilizing dedicated utility software but also the following functions. For example, a file-sharing function for "disclosing a file system of a digital multifunction peripheral via a network" can be realized using a general-purpose protocol. Protocols, such as server message block (SMB) and distributed authoring and versioning protocol for the WWW (Web DAV), can be used as the general-purpose protocol. In addition, by providing the file-sharing function using the general-purpose protocol, users can access a file of a file system from general-purpose application software, such as a file explorer of Windows 2000/XP.

Furthermore, a storage area (hereinafter, referred to as a hot folder) having a file-sharing function and a function-flow executing function of a digital multifunction peripheral may be provided in the digital multifunction peripheral. By storing a file in the hot folder, it may be possible to realize a function for executing a function flow (i.e., workflow). For example, an environment in which a plurality of information terminals and a plurality of digital multifunction peripherals (image processing apparatuses) are connected via a network will be considered.

Figure 12:
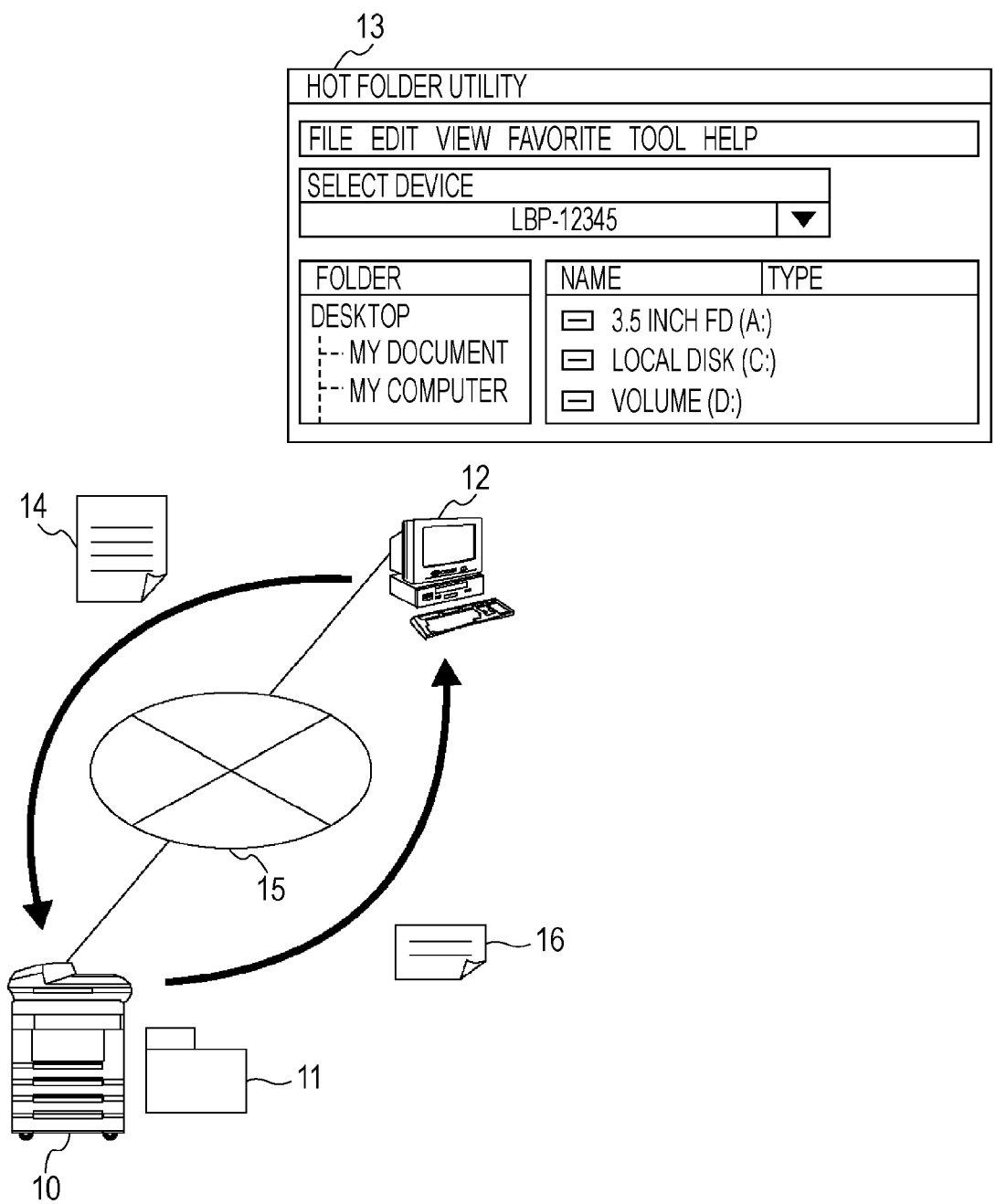
FIG. 12 is a diagram conceptually showing an example process of executing a function flow using dedicated utility software.

FIG. 12 is a diagram conceptually showing an example process for executing a function flow using dedicated utility software.

As shown in FIG. 12, a digital multifunction peripheral 10 has a hot folder 11. Dedicated utility software 13 installed in an information terminal 12 can transmit file data (e.g., document data 14) to the digital multifunction peripheral 10 via a network 15 to enter the file data in the hot folder 11 and activate a function flow. At this time, the document data 14 is transmitted using a dedicated protocol used between the information terminal 12 and the digital multifunction peripheral 10. The digital multifunction peripheral 10 transmits a function flow execution result 16 to the information terminal 12 using the dedicated protocol.

FIG. 13 is a diagram conceptually showing an example process of storing a file in a hot folder using a general-purpose protocol.

As shown in FIG. 13, file data (e.g., document data 14a or 14b) can be stored in a hot folder 11 from a file explorer 21 of Windows 2000/XP as well as dedicated utility software 13. In this case, a user performs a drag-and-drop operation to move an icon of the document data 14a or 14b displayed in the file explorer 21 to an icon of the hot folder 11 using an information terminal 12a or 12b. In this manner, the file explorer 21 can transmit the file data (e.g., document data 14a or 14b) to a digital multifunction peripheral 10 using a general-purpose protocol to enter the file data in the hot folder 11 and activate a function flow. The user can refer to the hot folder 11 of the digital multifunction peripheral 10 as a shared folder through the file explorer 21. With such a configuration, the user can execute processing, such as at least one of printing, copying, and mail transmission, by relatively flexibly and simply combining functions of the digital multifunction peripheral 10.

As shown in FIG. 12, when the document data 14 is stored in the hot folder 11 according to the dedicated protocol using the dedicated utility software 13, it is possible to appropriately notify users of an error caused in the hot folder 11. More specifically, it is possible to appropriately notify the users of at least one of an error regarding the file-sharing function and an error regarding a function-flow executing function using the dedicated protocol. In this case, the user may be unable to utilize the hot folder through general-purpose software, such as the file explorer 21 of Windows 2000/XP, which thus reduces user's convenience.

On the other hand, when a general-purpose protocol, such as SMB or Web DAV, is utilized, the user can utilize the hot folder 11 through general-purpose software.

Figure 14:
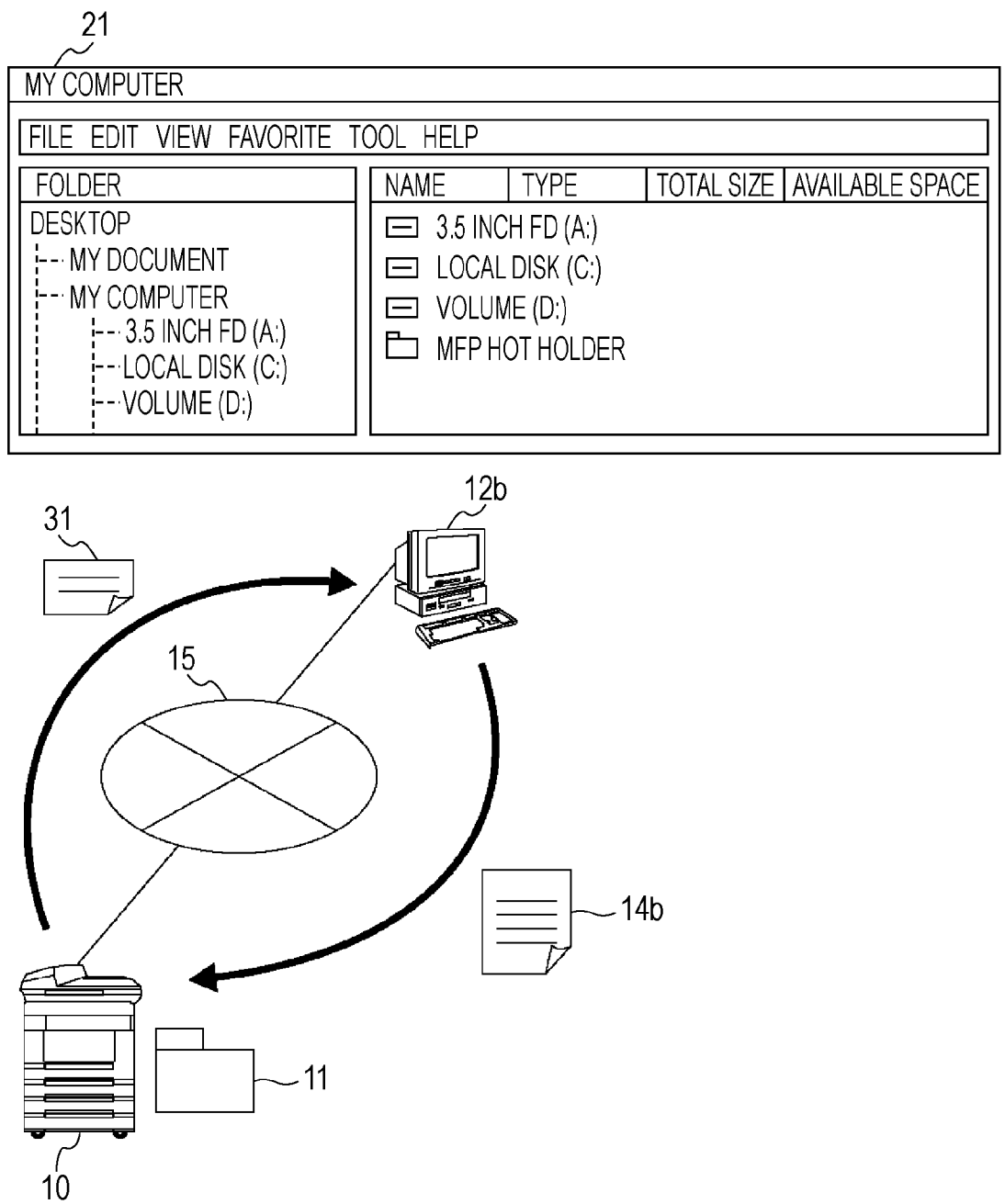
FIG. 14 is a diagram conceptually showing an example of a state where an error regarding a file-sharing function occurs in a general-purpose-protocol utilizing environment.
Figure 15:
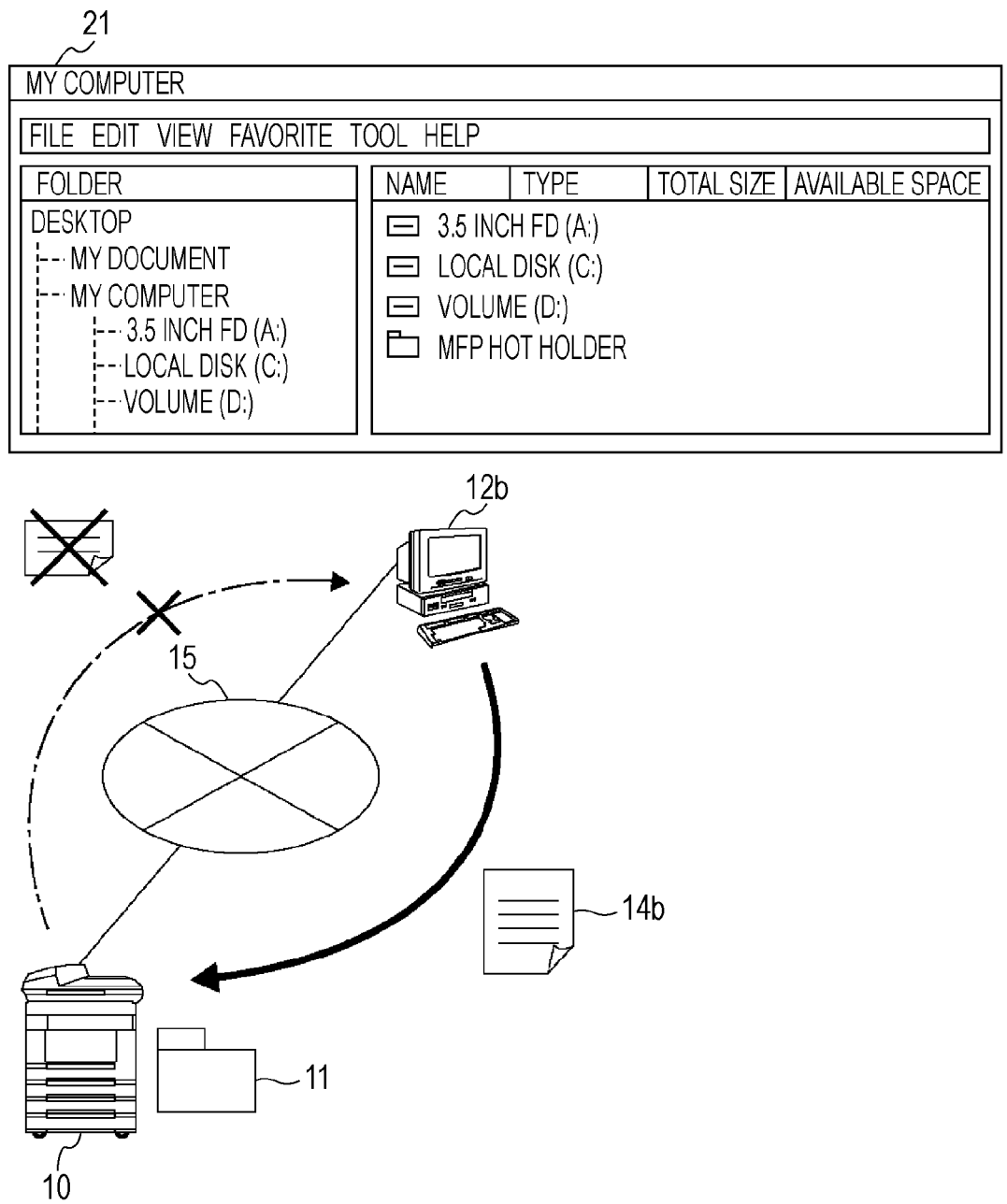
FIG. 15 is a diagram conceptually showing an example of a state where an error regarding a function-flow executing function occurs in a general-purpose-protocol utilizing environment.

FIG. 14 is a diagram conceptually showing an example of a state where an error regarding a file-sharing function occurs in a general-purpose-protocol utilizing environment. FIG. 15 is a diagram conceptually showing an example of a state where an error regarding a function-flow executing function occurs in a general-purpose-protocol utilizing environment.

When the document data 14b is stored in the hot folder 11, it is possible to notify the user of an error 31 regarding the file-sharing function in accordance with a specification of the general-purpose protocol as shown in FIG. 14.

However, the general-purpose protocol is utilized to share files among the PCs here. Accordingly, when an error regarding the function-flow executing function occurs, the user may not be notified of the error due to a restriction of the protocol as shown in FIG. 15. As a result, the user may not be able to recognize the content of the error nor a failure in execution of the function flow.

The error regarding the function-flow executing function indicates an error that may be caused in execution of the function flow, for example, like errors (1) and (2) shown below.

(1) Processing is not executable due to shortage of a usable memory capacity.
(2) The number of activated function flows has exceeded a limit.

As described above, when a general-purpose protocol is used, the user may not be certain of notification of an error caused in the hot folder.

Accordingly, an embodiment of the present invention realizes a configuration that can notify a user of information regarding an error caused in a workflow in accordance with a protocol used at the time of activation of a function flow (i.e., workflow).

A first exemplary embodiment of the present invention will be described below with reference to the accompanying drawings.

Figure 1:
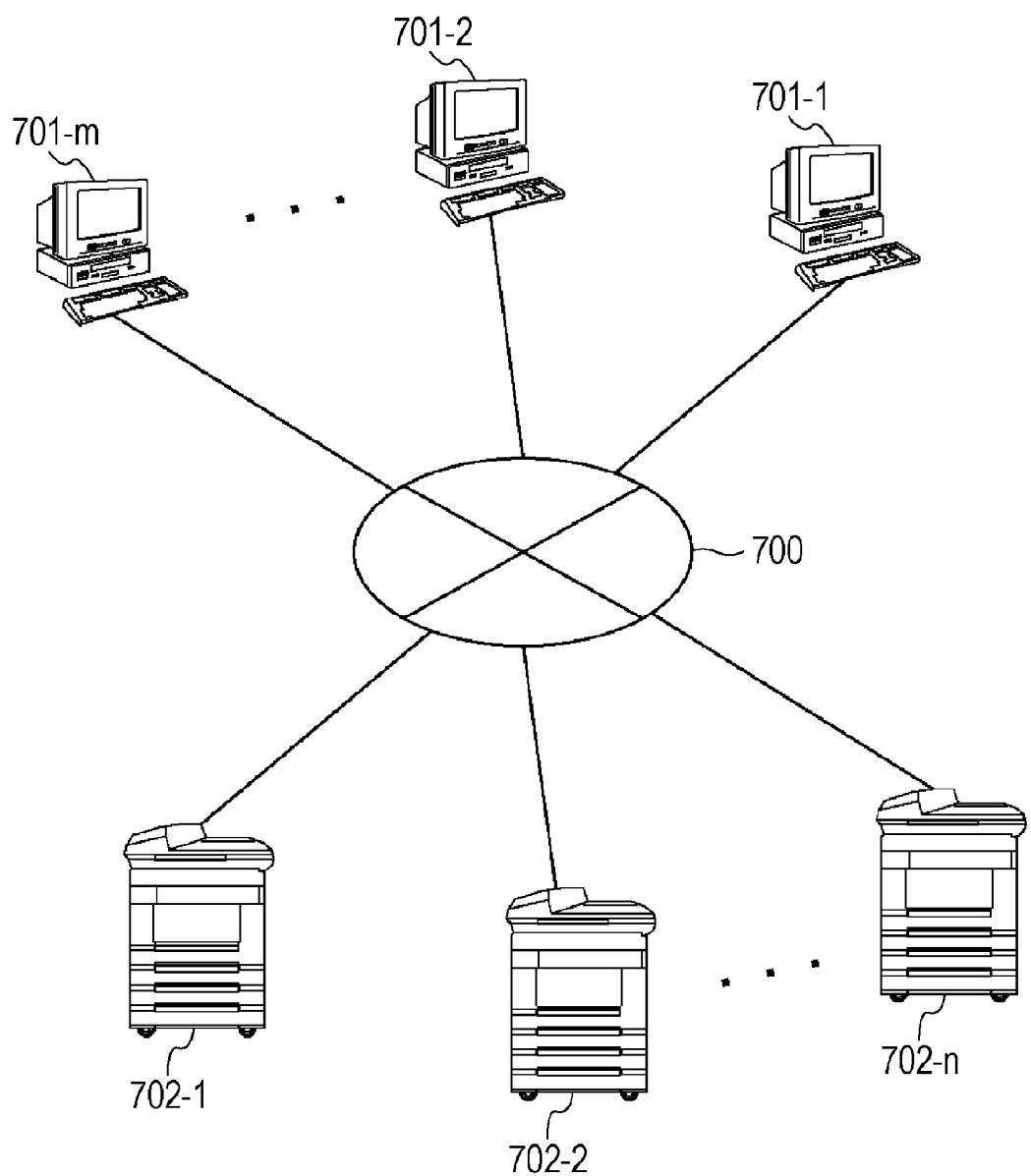
FIG. 1 is a diagram showing an example of a configuration of a network system according to a first exemplary embodiment of the present invention.

FIG. 1 is a diagram showing an example of a configuration of a network system. The network system shown in FIG. 1 is realized by, for example, providing digital multifunction peripherals (e.g., image processing apparatuses) at the offices of companies.

Referring to FIG. 1, the network system has a plurality of information terminals 701-1, 701-2, . . . , and 701-m, and a plurality of digital multifunction peripherals 702-1, 702-2, . . . , and 702-n. An example of the information terminal may be a PC. The digital multifunction peripheral is an example of a data processing apparatus. The information terminals 701 and the digital multifunction peripherals 702 are connected to each other via a network 700 in a communication-executable manner. The network 700 may be a given network, such as the Internet or an intranet. For ease of explanation, hereinafter, each of the plurality of information terminals 701-1 to 701-m is generally referred to as an information terminal 701-X. In addition, each of the plurality of digital multifunction peripherals 702-1 to 702-n is generally referred to as a digital multifunction peripheral 702-Y.

Figure 2:
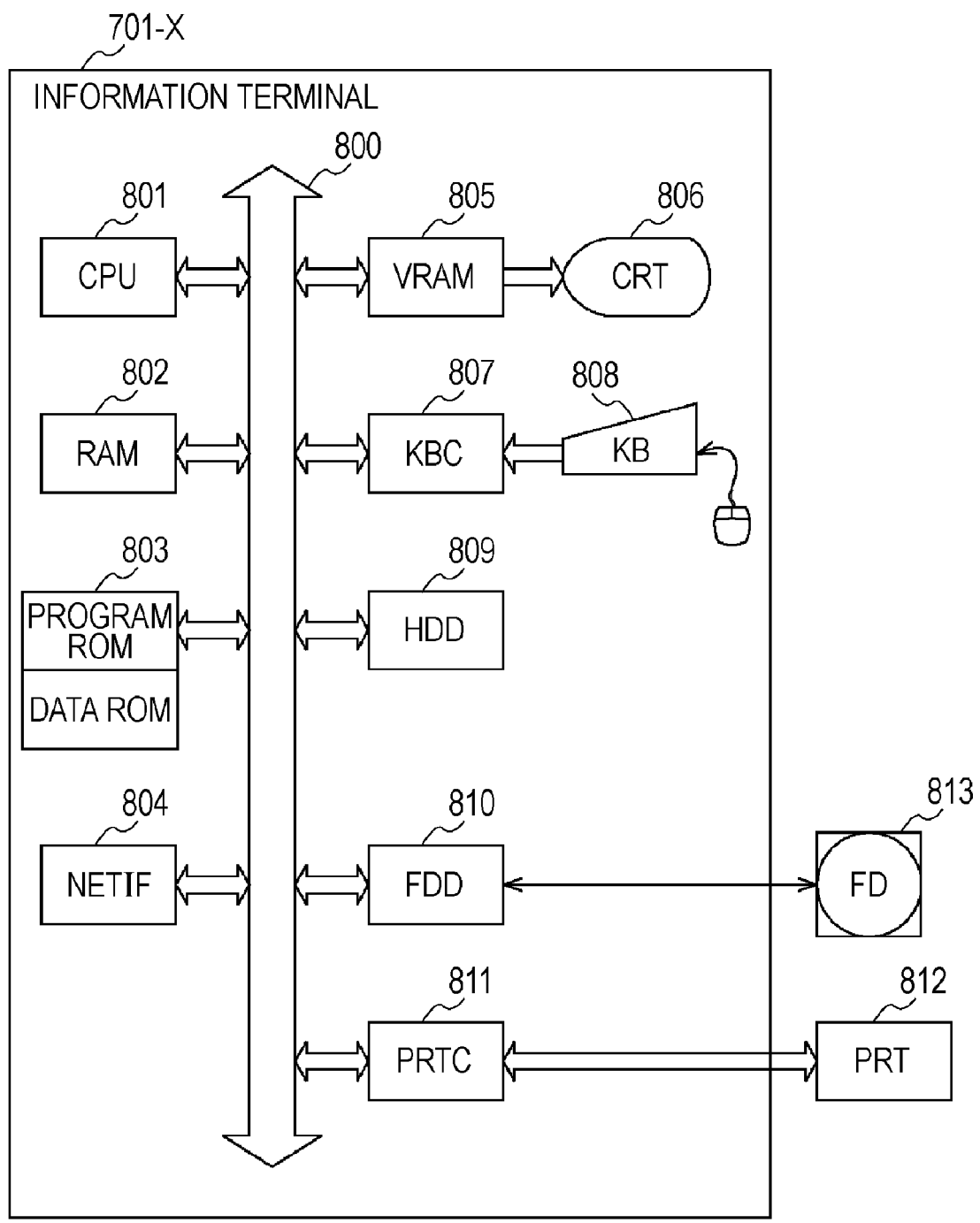
FIG. 2 is a diagram showing an example of a hardware configuration of an information terminal according to a first exemplary embodiment of the present invention.

FIG. 2 is a diagram showing an example of a hardware configuration of the information terminal 701-X.

Referring to FIG. 2, a central processing unit (CPU) 801 takes charge of calculation and control of the information terminal 701-X.

A random access memory (RAM) 802 functions as a main memory of the CPU 801 and an execution area and a data area of executed programs. A read-only memory (ROM) 803 stores operation processing procedures of the CPU 801. The ROM 803 includes a program ROM for storing basic software (OS), which is a system program for controlling devices of the information terminal 701-X, and a data ROM for storing information used in operations of the system. Depending on devices, a hard disk drive (HDD) 809 to be described later may be used instead of the ROM 803.

A network interface (NETIF) 804 controls transfer of data between the information terminals 701 via the network 700 and diagnoses a status of connection to the network 700.

A video RAM (VRAM) 805 is used when an image indicating an operation state of the information terminal 701-X to be displayed on a screen of a display device (CRT) 806 is rendered and display of the image is controlled. The CRT 806 is a display device.

A controller (hereinafter, referred to as "KBC") 807 controls input signals from a KB 808. The KB 808 is an external input device for receiving user operations. The KB 808 may be, for example, a keyboard and a pointing device, such as a mouse.

The HDD 809 stores application programs and various kinds of data. The application programs according to this exemplary embodiment can indicate software programs for realizing various processing units according to this exemplary embodiment.

An FDD 810 is an external input/output device for inputting/outputting data to/from a removable disk (FD) 813. The FDD 810 is used for reading out the above-described application programs from a removable medium.

The FD 813 is a removable data recording device (i.e., removable medium) for storing data to be read out by the FDD 810. The FD 813 may be, for example, at least one of a magnetic recording medium, an optical recording medium, a magneto-optical recording medium, and a semiconductor recording medium. For example, the magnetic recording medium may be a flexible disk. The optical recording medium may be, for example, a CD-ROM. The magneto-optical recording medium may be, for example, an MO. The semiconductor recording medium may be, for example, a memory card.

The application programs and the data stored in the HDD 809 may be stored in the FD 813.

A printer controller (PRTC) 811 controls output signals to a printer (PRT) 812. The PRT 812 is a printing apparatus. The PRT 812 may be, for example, a laser beam printer (LBP).

A transmission bus 800 connects the above-described units to each other. The transmission bus 800 includes, for example, an address bus, a data bus, an input/output bus, and a control bus.

Figure 3:
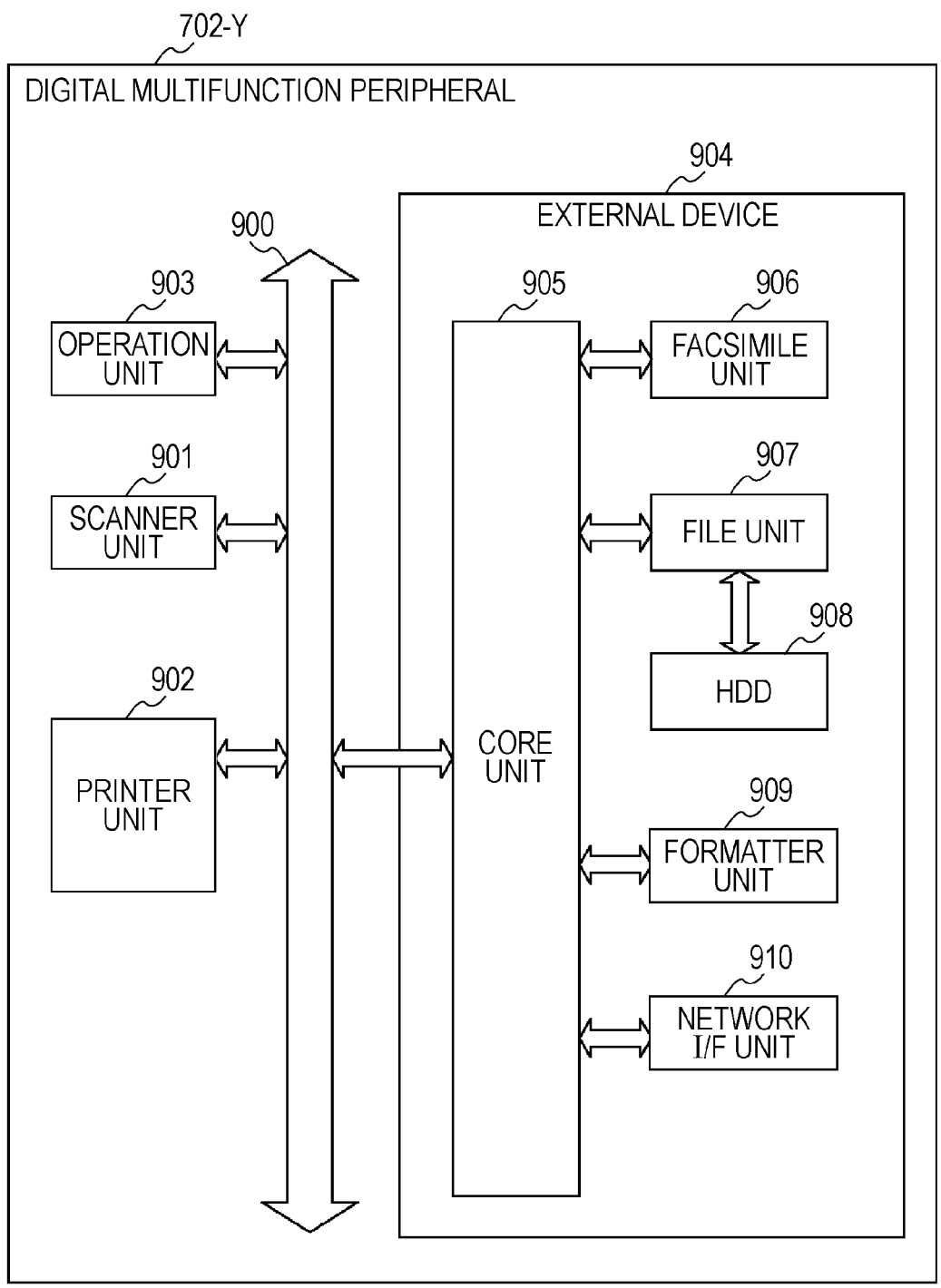
FIG. 3 is a diagram showing an example of a hardware configuration of a digital multifunction peripheral according to a first exemplary embodiment of the present invention.

FIG. 3 is a diagram showing an example of a hardware configuration of the digital multifunction peripheral (image processing apparatus) 702-Y.

Referring to FIG. 3, a scanner unit 901 is an image input device for converting a document image into image data. The scanner unit 901 optically reads (scans) a document image with a charge coupled device (CCD) image sensor or the like to convert the document image into digital image data and output the digital image data.

A printer unit 902 has a plurality of recording sheet cassettes. The printer unit 902 is an image output device for outputting an image based on the digital image data supplied from the scanner unit 901 as a visible image in response to a print instruction from the scanner unit 901.

An operation unit 903 is an operation panel operated by a user to enter, for example, an instruction for converting a document image into digital image data, an instruction for executing processing on an external device 904 electrically connected to the scanner unit 901, and so forth.

An external device 904 includes a core unit 905, a facsimile unit 906, a file unit 907, an external storage device (HDD) 908 connected to the file unit 907, a formatter unit 909, and a network interface (I/F) unit 910. Each unit of the external device 904 realizes the following functions.

The core unit 905 manages a status of each unit of the external device 904, controls input/output of commands, and controls input/output of image data. The facsimile unit 906 controls a facsimile function. The file unit 907 controls a file system function for managing files stored in the external storage device 908. The formatter unit 909 executes processing for converting information of image data into visible images. The network I/F unit 910 connects the digital multifunction peripheral 702-Y to the network 700 and communicates with external devices.

A transmission bus 900 connects the scanner unit 901, the printer unit 902, the operation unit 903, and the external device 904 to each other. The transmission bus 900 includes an address bus, a data bus, an input/output bus, and a control bus.

Figure 4:
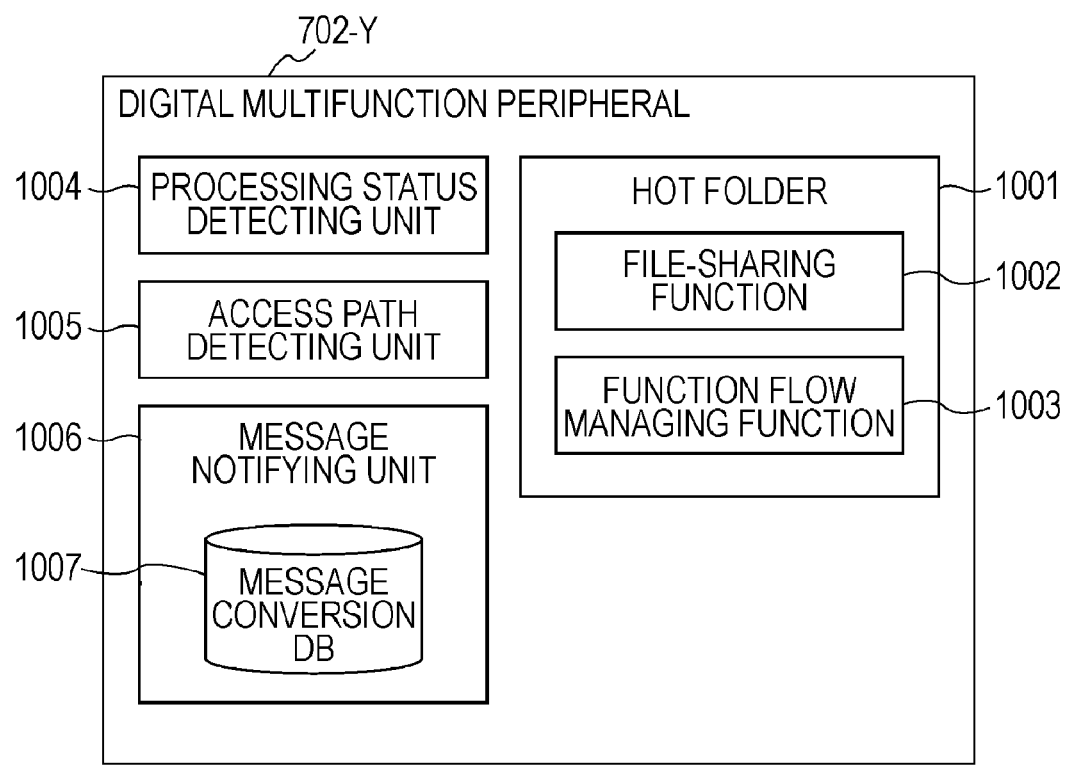
FIG. 4 is a diagram showing an example of a functional configuration of a digital multifunction peripheral according to a first exemplary embodiment of the present invention.

FIG. 4 is a diagram showing an example of a functional configuration of the digital multifunction peripheral 702-Y.

A hot folder 1001 is a storage area having a file-sharing function 1002 and a function flow managing function (i.e., processing managing function) 1003. Here, the function flow indicates a flow that is defined by combining at least one or two functions (e.g., scanning, copying, printing, data storage, and transmission) of the digital multifunction peripheral 702-Y. For example, the following kinds of processing (1) and (2) can be executed through execution of one function flow.

(1) An example of a function flow defined by combining a data storage function, a printing function, and a transmission function An image based on data stored in a file is printed in accordance with a predetermined print setting and the data of the image is also transmitted as a mail to a predetermined mail address.

(2) An example of a function flow defined by combining a scanning function, a data storage function, and a printing function A paper document is scanned to acquire scanned data, the scanned data is combined with data included in a file stored in the digital multifunction peripheral, an image based on the combined data is printed in accordance with a predetermined printing setting.

The file-sharing function 1002 discloses the hot folder 1001 as a storage area that can be shared among the plurality of information terminals 701 connected via the network using a general-purpose protocol, such as SMB and Web DAV, or a dedicated protocol. The file-sharing function 1002 allows the information terminal 701-X to store a document file in the hot folder 1001 utilizing general-purpose application software. Here, the general-purpose application software indicates software, such as the file explorer of Windows® 2000/XP, that supports a general-purpose protocol, such as SMB and Web DAV. The general-purpose protocol is used to utilize, for example, the file-sharing function 1002. Hereinafter, the general-purpose protocol may simply be referred to as a protocol.

The function flow managing function 1003 realizes following functions. The function flow managing function 1003 receives a document file transmitted from dedicated utility software utilizing a dedicated protocol and stores the received document file in the hot folder 1001 disclosed by the file-sharing function 1002. The function flow managing function 1003 then activates a pre-registered function flow in response to storage of the document file in the hot folder 1001.

The hot folder 1001 realizes the following operations (1) and (2) thanks to the file-sharing function 1002 and the function flow managing function 1003.

(1) A document file is received from general-purpose application software supporting a general-purpose protocol, such as SMB and Web DAV, as well as dedicated utility software and is stored in the hot folder 1001.

(2) A pre-registered function flow is activated in response to storage of the document file.

A processing status detecting unit 1004 detects whether an error is caused when the hot folder 1001 activates a function flow. When the error occurs, the processing status detecting unit 1004 detects whether the error is based on the file-sharing function 1002 or the function flow managing function 1003. More specifically, the processing status detecting unit 1004 detects whether the error is caused in the file-sharing function 1002 or the function flow managing function 1003.

An access path detecting unit 1005 detects a transmission path (i.e., access path) of the received document file when the processing status detecting unit 1004 detects the error. More specifically, the access path detecting unit 1005 detects whether the document file is transmitted (e.g., from dedicated utility software) utilizing a dedicated protocol or the document file is transmitted (e.g., from general-purpose application software) utilizing a general-purpose protocol.

A message notifying unit 1006 is capable of changing a message notification method and a message content in accordance with the access path detected by the access path detecting unit 1005. More specifically, when the document file is transmitted utilizing a dedicated protocol, the message notifying unit 1006 notifies the information terminal 701-X of an error item caused in the file-sharing function 1002 or the function flow managing function 1003 as it is. On the other hand, when the document file is transmitted utilizing a general-purpose protocol, the message notifying unit 1006 converts the error item caused in the function flow managing function 1003 in accordance with a specification of the general-purpose protocol, and notifies the information terminal 701-X of the converted error item.

A message conversion database (DB) 1007 may be referred to by the message notifying unit 1006 when the message notifying unit 1006 converts the error item caused in the function flow managing function 1003 in accordance with the specification of the general-purpose protocol.

FIG. 5 is a diagram conceptually showing an example of a data configuration of the message conversion DB 1007. Here, a description will be given for a case of utilizing Web DAV as the general-purpose protocol.

Referring to FIG. 5, a function flow error code 1101 shows error codes of error items caused in the function flow managing function 1003.

A Web DAV error code 1102 shows Web DAV error codes corresponding to the error codes (e.g., function flow error code 1101) of the function flow managing function 1003. The message notifying unit 1006 converts the error item caused in the function flow managing function 1003 with reference to a correspondence between the function flow error code 1101 and the Web DAV error code 1102.

FIG. 6 is a flowchart illustrating an example of processing executed by the digital multifunction peripheral 702-Y.

At STEP S1201, the hot folder 1001 monitors a status change, such as storage of a new document file therein.

At STEP S1202, the hot folder 1001 determines whether the document file is newly stored therein. If the determination result indicates that the document file is not newly stored (NO in STEP S1202), the process returns to STEP S1201. STEPs S1201 and S1202 are repeated until the document file is newly stored. If the document file is newly stored (YES in STEP S1202), the process proceeds to STEP S1203.

At STEP S1203, the hot folder 1001 invokes the access path detecting unit 1005. The access path detecting unit 1005 determines whether the type of a protocol utilized when the document file is newly stored is a dedicated protocol unique to the information terminal 701-X and the digital multifunction peripheral 702-Y, or a general-purpose protocol. The access path detecting unit 1005 stores the determination result.

At STEP S1204, the hot folder 1001 activates a pre-defined function flow to start processing the document file that is determined to be newly stored at STEP S1202.

At STEP S1205, the processing status detecting unit 1004 determines whether an error of the function flow has occurred during execution of the function flow. If the determination result indicates that the error has not occurred (NO in STEP S1205), the process shown by the flowchart in FIG. 6 terminates. If the error has occurred (YES in STEP S1205), the process proceeds to STEP S1206.

At STEP S1206, the processing status detecting unit 1004 inquires of the access path detecting unit 1005 about the protocol used when the document file that is determined to be newly stored at STEP S1202 is received. The processing status detecting unit 1004 then determines whether the protocol used at the time of reception of the document file is a general-purpose protocol on the basis of the inquiry result.

As described above, in this exemplary embodiment, an example of a protocol determining unit is realized, for example, by executing processing at STEP S1206.

If the determination result indicates that the protocol used at the time of reception of the document file is not a general-purpose protocol (NO in STEP S1206), the process proceeds to STEP S1207, which will be described later. If the protocol used at the time of reception of the document file is the general-purpose protocol (YES in STEP S1206), the process proceeds to STEP S1208.

At STEP S1207, the processing status detecting unit 1004 notifies the message notifying unit 1006 that the protocol used at the time of reception of the document file is the dedicated protocol. Upon receiving the notification from the processing status detecting unit 1004, the message notifying unit 1006 inquires of the hot folder 1001 about error information, such as an error code. The message notifying unit 1006 notifies the document-file transmission source (e.g., information terminal 701-X) of the error information acquired in response to the inquiry as it is utilizing the dedicated protocol. The process shown by the flowchart in FIG. 6 then terminates.

At STEP S1208, the processing status detecting unit 1004 inquires the hot folder 1001 about error information, such as an error code. The processing status detecting unit 1004 determines whether the error has occurred in the file-sharing function 1002 on the basis of the error information acquired in response to the inquiry. If the determination result indicates that the error has occurred in the file-sharing function 1002 (YES in STEP S1208), the process proceeds to STEP S1213, which will be described later. If the error has not occurred in the file-sharing function 1002 (NO in STEP S1208), the process proceeds to STEP S1209.

At STEP S1209, the processing status detecting unit 1004 determines whether the error has occurred in the function flow managing function 1003 on the basis of the error information acquired in response to the inquiry. If the determination result indicates that the error has not occurred in the function flow managing function 1003 (NO in STEP S1209), the process proceeds to STEP S1211, which will be described later. If the error has occurred in the function flow managing function 1003 (YES in STEP S1209), the process proceeds to STEP S1210.

As described above, in this exemplary embodiment, an example of a function determining unit is realized, for example, by executing the processing at STEPs S1208 and S1209.

At STEP S1210, the processing status detecting unit 1004 notifies the message notifying unit 1006 of information indicating that the protocol used at the time of reception of the document file is a general-purpose protocol and error information (e.g., error code) acquired at STEP S1208. The message notifying unit 1006 then refers to the message conversion DB 1007. The message notifying unit 1006 converts the error information (e.g., function flow error code 1101) supplied by the processing status detecting unit 1004 into error information (e.g., Web DAV error code 1102) corresponding to the general-purpose protocol. The process then proceeds to STEP S1212, which will be described later.

At STEP S1211, the processing status detecting unit 1004 notifies the message notifying unit 1006 of information indicating that the protocol used at the time of reception of the document file is a general-purpose protocol and information indicating that the error is an unknown error. The message notifying unit 1006 converts the unknown error information (e.g., function flow error code 1101) into error information (e.g., Web DAV error code 1102) corresponding to the general-purpose protocol with reference to the message conversion DB 1007. The process then proceeds to STEP S1212.

As described above, in this exemplary embodiment, an example of a converting unit is realized, for example, by executing the processing at STEPs S1210 and S1211.

At STEP S1212, the message notifying unit 1006 notifies the document-file transmission source (information terminal 701-X) of the error information converted at STEP S1210 or S1211 utilizing the general-purpose protocol. The process shown by the flowchart in FIG. 6 then terminates.

As described above, in this exemplary embodiment, an example of a transmitting unit is realized, for example, by executing the processing at STEP S1212.

As described before, when it is determined that the error has occurred in the file-sharing function 1002 at STEP S1208, the process proceeds to STEP S1213. At STEP S1213, the processing status detecting unit 1004 executes following processing. More specifically, the processing status detecting unit 1004 notifies the message notifying unit 1006 of information indicating that the protocol used at the time of reception of the document file is a general-purpose protocol and information indicating that the error is regarding the file-sharing function 1002. The message notifying unit 1006 notifies the document-file transmission source (e.g., information terminal 701-X) of the error information as it is utilizing the general-purpose protocol.

FIG. 7 is a diagram conceptually showing an example of a process of notifying of error information in the network system according to this exemplary embodiment.

In the example shown in FIG. 7, an information terminal 701-X1 and the digital multifunction peripheral 702-Y perform communication using a dedicated protocol. An information terminal 701-X2 and the digital multifunction peripheral 702-Y perform communication using a general-purpose protocol.

Suppose that an error is caused when a user enters a file in the hot folder 1001 using dedicated utility software 710 installed in the information terminal 701-X1 and activates a function flow. In this case, as described above, the digital multifunction peripheral 702-Y transmits error information compliant with the dedicated protocol to the information terminal 701-X1 regardless of the content of the error (STEP S1207).

On the other hand, if an error is caused when the user enters a file in the hot folder 1001 using a file explorer 711 installed in the information terminal 701-X2 and activates a function flow, the digital multifunction peripheral 702-Y determines whether the error is regarding the file-sharing function 1002 or regarding the function flow managing function 1003 on the basis of the error information. If the error is regarding the file-sharing function 1002, the digital multifunction peripheral 702-Y transmits the error information compliant with the general-purpose protocol to the information terminal 701-X2 as it is (STEP S1213).

If the error is regarding the function flow managing function 1003, the digital multifunction peripheral 702-Y converts the error information into error information compliant with a specification of the general-purpose protocol using the message conversion DB 1007. The digital multifunction peripheral 702-Y then transmits the converted error information to the information terminal 701-X2 (STEPs S1210 and S1212). In this manner, an error message dialog box 711a indicating the content of the error is displayed on a screen of the CRT 806 of the information terminal 701-X2.

In other words, generally speaking, if it is supposed that an error occurs in a workflow after an operator enters a file in a hot folder of an image processing apparatus using a file explorer installed in an information terminal to activate the workflow, then in this case, the image processing apparatus may determine whether the error is regarding the workflow of a file-sharing function on the basis of error information. If the error is regarding the workflow of the file-sharing function, the image processing apparatus can convert the error information into one compliant with a specification of a general-purpose protocol using a conversion function. The image processing apparatus may then transmit the converted error information to the information terminal.

Accordingly, it is possible to notify general-purpose application software with certainty of error information caused in the function flow managing function 1003 when a file is stored in the hot folder 1001 using a general-purpose protocol. It is also possible to notify users of information regarding an error caused in a workflow in accordance with a protocol used when execution of the workflow is instructed.

A second exemplary embodiment of the present invention will now be described.

In the above-described first exemplary embodiment, the description has been given for an example case of notifying a document-file transmission source of error information without exception when an error has occurred. However, the error regarding the function flow managing function 1003 may be an error caused because processing has failed due to some reason or an error simply notifying a user of warning level information. Furthermore, the function flow corresponding to the error caused because the processing has failed may be retryable (re-executable) or may not be retryable. The retryable function flow errors include, for example, an error that "a CPU usage rate has exceeded a threshold" and an error that "a job instance cannot be created due to lack of resources". The function flow errors that are not retryable include, for example, an error that "invalid processing is performed", an error that "processing for a job is not acceptable", and an error that "an unknown error has occurred".

Whether a function flow corresponding to an error is retryable or not is often determined by providing a threshold for resources, such as a CPU usage rate and shortage of resources (e.g., the memory and the number of processes). When a document file is stored in a hot folder of a digital multifunction peripheral using dedicated utility software and a retryable error is caused, the dedicated utility software can be notified of appropriate error information. Accordingly, the dedicated utility software having received the error information interprets the error information and can retry a function flow.

On the other hand, if a document file is stored in a hot folder of a digital multifunction peripheral using a general-purpose protocol, the following processing is executed in the first exemplary embodiment. More specifically, the general-purpose application software is notified of error information compliant with a specification of the general-purpose protocol without exception regardless of whether the error is retryable or not. Accordingly, the general-purpose application software having received the error information may be unable to appropriately interpret whether the error is retryable or not based on the error information. Furthermore, the general-purpose application software may be often unable to execute processing, such as retry processing.

In this exemplary embodiment, when an error regarding a function flow managing function has occurred in a system capable of entering a file in a hot folder using a dedicated protocol and a general-purpose protocol, a function flow can be retried (i.e., re-executed) depending on a type of the error. In this manner, the second exemplary embodiment differs from the first exemplary embodiment in that processing is retried depending on a type of an error if the error regarding the function flow managing function is caused when a file is entered in a hot folder using a general-purpose protocol. Accordingly, a detailed description regarding parts that are the same as or similar to those of the above-described first exemplary embodiment is omitted in the description of this exemplary embodiment by attaching reference characters similar to those of FIGS. 1-7.

Figure 8:
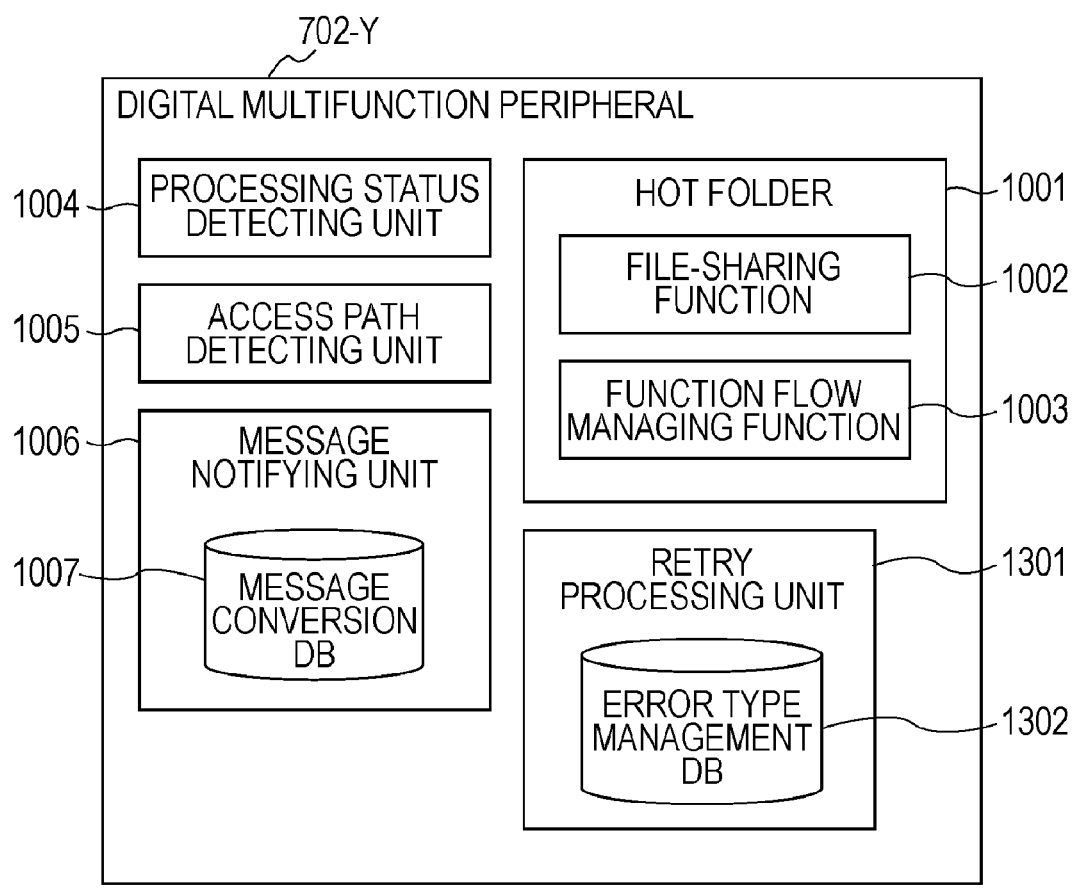
FIG. 8 is a diagram showing an example of a functional configuration of a digital multifunction peripheral according to a second exemplary embodiment of the present invention.

FIG. 8 is a diagram showing an example of a functional configuration of a digital multifunction peripheral 702-Y.

A retry processing unit 1301 determines whether a type of an error is retryable, not retryable, or is a warning. The retry processing unit 1301 activates retry processing in accordance with the determined error type.

An error type management database (DB) 1302 manages the error type, a determination item for activation of retry processing and a threshold thereof, and an upper limit value of the number of times of retry processing.

Figure 9:
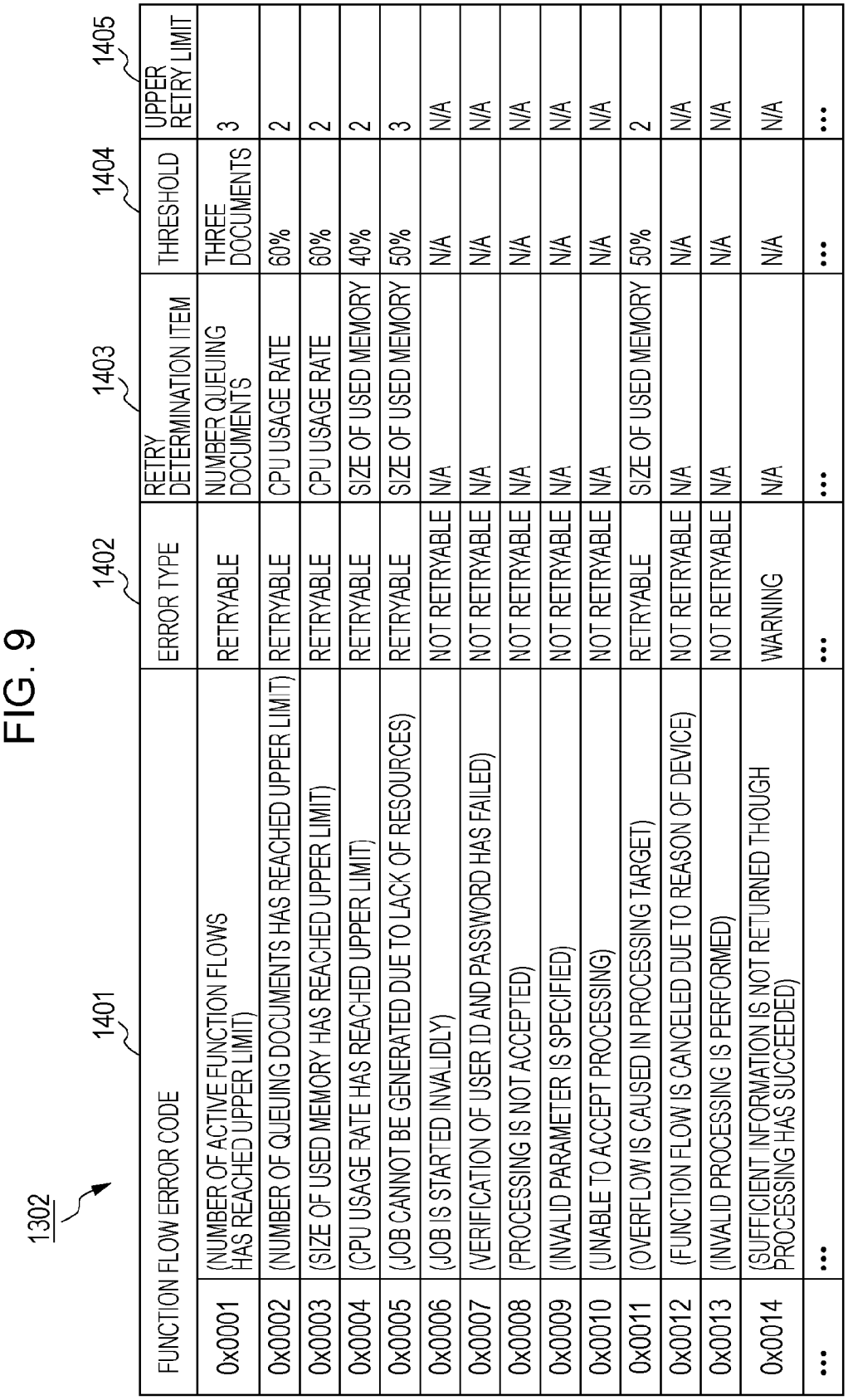
FIG. 9 is a diagram conceptually showing an example of a data configuration of an error type management DB according to a second exemplary embodiment of the present invention.

FIG. 9 is a diagram conceptually showing an example of a data configuration of the error type management DB 1302.

Referring to FIG. 9, a function flow error code 1401 shows error codes of error items caused in the function flow managing function 1003.

An error type 1402 shows error types, such as retryable, not retryable, and a warning. In this exemplary embodiment, as the error type 1402, a retryable error, an error that is not retryable, and a warning error are denoted as "retryable", "not retryable", and "warning", respectively.

A retry determination item 1403 shows an item to be referred to when determining whether to retry the processing. A threshold 1404 of the retry determination item shows a threshold for the item to be referred to when determining whether to retry the processing. For example, if a value of the item to be referred to when determining whether to retry the processing does not exceed the threshold registered as the threshold 1404 of the retry determination item, retry processing is activated. An upper retry limit 1405 shows an upper limit value of the number of times for retry processing. For example, if the number of times for the retry processing exceeds the upper limit registered as the upper retry limit 1405, the retry processing is not performed.

Figure 10:
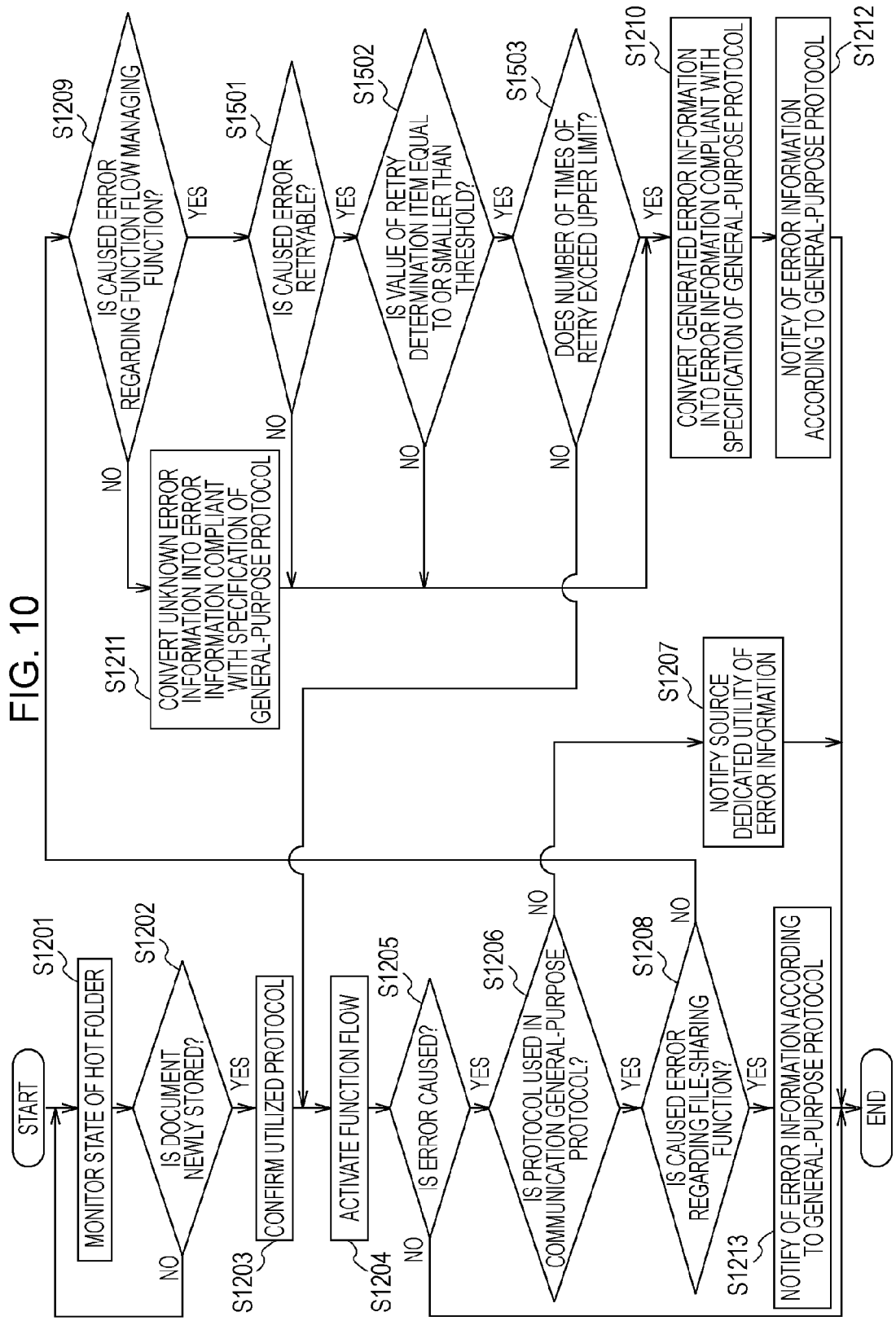
FIG. 10 is a flowchart illustrating an example of processing executed by a digital multifunction peripheral according to a second exemplary embodiment of the present invention.

FIG. 10 is a flowchart illustrating an example of processing executed by the digital multifunction peripheral 702-Y.

STEPs S1201-S1213 are similar to those described in the first exemplary embodiment (FIG. 6) except for two points.

STEPs S1501 to S1503 are added between STEPs S1209 and S1210.

If it is determined that an error has not occurred at STEP S1205 (NO in STEP S1205), the retry processing unit 1301 resets a retry value to 0. The retry value is stored in, for example, the HDD 908.

If a protocol used at the time of reception of a document file is a general-purpose protocol (YES in STEP S1206) and an error regarding the function flow managing function 1003 is caused (NO in STEP S1208 and YES in STEP S1209), the process proceeds from STEP S1209 to STEP S1501.

At STEP S1501, the processing status detecting unit 1004 notifies the retry processing unit 1301 of error information acquired at STEP S1208. The retry processing unit 1301 acquires the error type 1402 corresponding to the notified error information with reference to the function flow error code 1401 and the error type 1402 of the error type management DB 1302. The retry processing unit 1301 then determines whether the error is retryable with reference to the acquired error type 1402.

As described above, in this exemplary embodiment, an example of an error determining unit is realized by executing the processing at STEP S1501, for example.

If the determination result indicates that the error is not retryable (NO in STEP S1501), the function flow is not retried. Accordingly, the process proceeds to STEP S1210, which has been described in the first exemplary embodiment, while skipping STEPs S1502 and S1503. At STEP S1210, the error information is converted into one compliant with a specification of the general-purpose protocol.

On the other hand, if the error is retryable (YES in STEP S1501), the process proceeds to STEP S1502. At STEP S1502, the retry processing unit 1301 acquires the retry determination item corresponding to the error information and the threshold thereof with reference to the function flow error code 1401, the retry determination item 1403, and the threshold 1404 of the error type management DB 1302. The retry processing unit 1301 determines whether the value corresponding to the acquired retry determination item does not exceed the acquired threshold with reference to the acquired retry determined item. For example, when the retry determination item 1403 and the threshold 1404 are "the size of the used memory" and "50%", respectively, the retry processing unit 1301 determines whether the size of the memory currently used by the system is equal to or lower than 50%. If the determination result indicates the value corresponding to the acquired retry determination item exceeds the threshold (NO in STEP S1502), the function flow is not retried. Thus, the process proceeds to STEP S1210, which has been described in the first exemplary embodiment, while skipping STEP S1503.

On the other hand, if the value corresponding to the acquired retry determination item does not exceed the threshold (YES in STEP S1502), the process proceeds to STEP S1503. At STEP S1503, the retry processing unit 1301 acquires the upper limit of the number of times of the retry processing corresponding to the acquired error information with reference to the function flow error code 1401 and the upper retry limit 1405 of the error type management DB 1302. The retry processing unit 1301 determines whether the number of times of the retry processing is equal to or smaller than the acquired upper retry limit with reference to the number of times of the retry processing stored in the HDD 908.

If the determination result indicates the number of times of the retry processing stored in the HDD 908 does not exceed the acquired upper retry limit (NO in STEP S1503), the retry processing unit 1301 increments the number of times of the retry processing by 1. The process then proceeds to STEP S1204, which has been described in the first exemplary embodiment. The function flow is then retried.

As described above, in this exemplary embodiment, an example of a processing re-executing unit is realized by executing the processing at STEP S1204, for example.

On the other hand, if the number of times of the retry processing stored in the HDD 908 exceeds the acquired upper retry limit (YES in STEP S1503), the retry processing unit 1301 resets the number of times of the retry processing to 0. The process then proceeds to STEP S1210, which has been described in the first exemplary embodiment.

As described above, in this exemplary embodiment, when an error has occurred in a function flow, execution of which is instructed using a general-purpose protocol, a digital multifunction peripheral determines whether to retry the function flow in accordance with a content registered in the error type management DB 1302. If the digital multifunction peripheral determines that the function flow is retryable, the digital multifunction peripheral retries the function flow. If the digital multifunction peripheral determines that the function flow is not retryable, the digital multifunction peripheral converts error information into one compliant with a specification of the general-purpose protocol and notifies an information terminal of the converted error information as in the case of the first exemplary embodiment.

Accordingly, in addition to the advantages described in the first exemplary embodiment, the second exemplary embodiment provides an advantage that the digital multifunction peripheral can retry processing depending on the error type even if an error that may not be retried by general-purpose application software is caused.

In this exemplary embodiment, when a protocol used at the time of reception of a document file is a general-purpose protocol and an error regarding the function flow managing function 1003 is caused, whether the function flow corresponding to the error is retryable is determined and a function flow is retried in accordance with the determination result. However, timing for determining whether the function flow corresponding to the error is retryable and retrying the function flow is not limited to this particular example. For example, when it is determined that the protocol used at the time of reception of a document file is a dedicated protocol, whether the function flow corresponding to the error is retryable may be determined and the function flow may be retried.

MODIFICATIONS

When the information terminal 701-X inquires about a property of the hot folder 1001 using a general-purpose protocol, such as SMB and Web DAV, the determination according to STEP S1502 may be applied.

For example, "inquiry about property of the hot folder" may be included in the function flow error code 1401 of the error type management DB 1302. The retry determination item 1403 and the threshold 1404 corresponding to the "inquiry about property of the hot folder" may be registered. For example, "not available (N/A)" indicating that reference is not necessary may be registered for the error type 1402 and the upper retry limit 1405.

If an inquiry about the property of the hot folder 1001 is made using a general-purpose protocol, a digital multifunction peripheral may execute the following processing. More specifically, the digital multifunction peripheral refers to the retry determination item 1403 and the threshold 1404 corresponding to the "inquiry about property of the hot folder" of the function flow error code 1401 of the error type management DB 1302.

If a value corresponding to the retry determination item 1403 does not exceed the threshold 1404, the digital multifunction peripheral determines that the function flow is executable. On the other hand, if the value corresponding to the retry determination item 1403 exceeds the threshold 1404, the digital multifunction peripheral determines that the function flow is not executable.

When the function flow is executable, the digital multifunction peripheral returns a state of the hot folder 1001 to the general-purpose application software as it is to respond the inquiry. On the other hand, when the function flow is not executable, the digital multifunction peripheral returns, for example, information indicating that a disk is full to the general-purpose application software as the property of the hot folder 1001 to respond the inquiry. The data may optionally be converted in accordance with a specification of the general-purpose protocol when returning the property in this manner.

Figure 11:
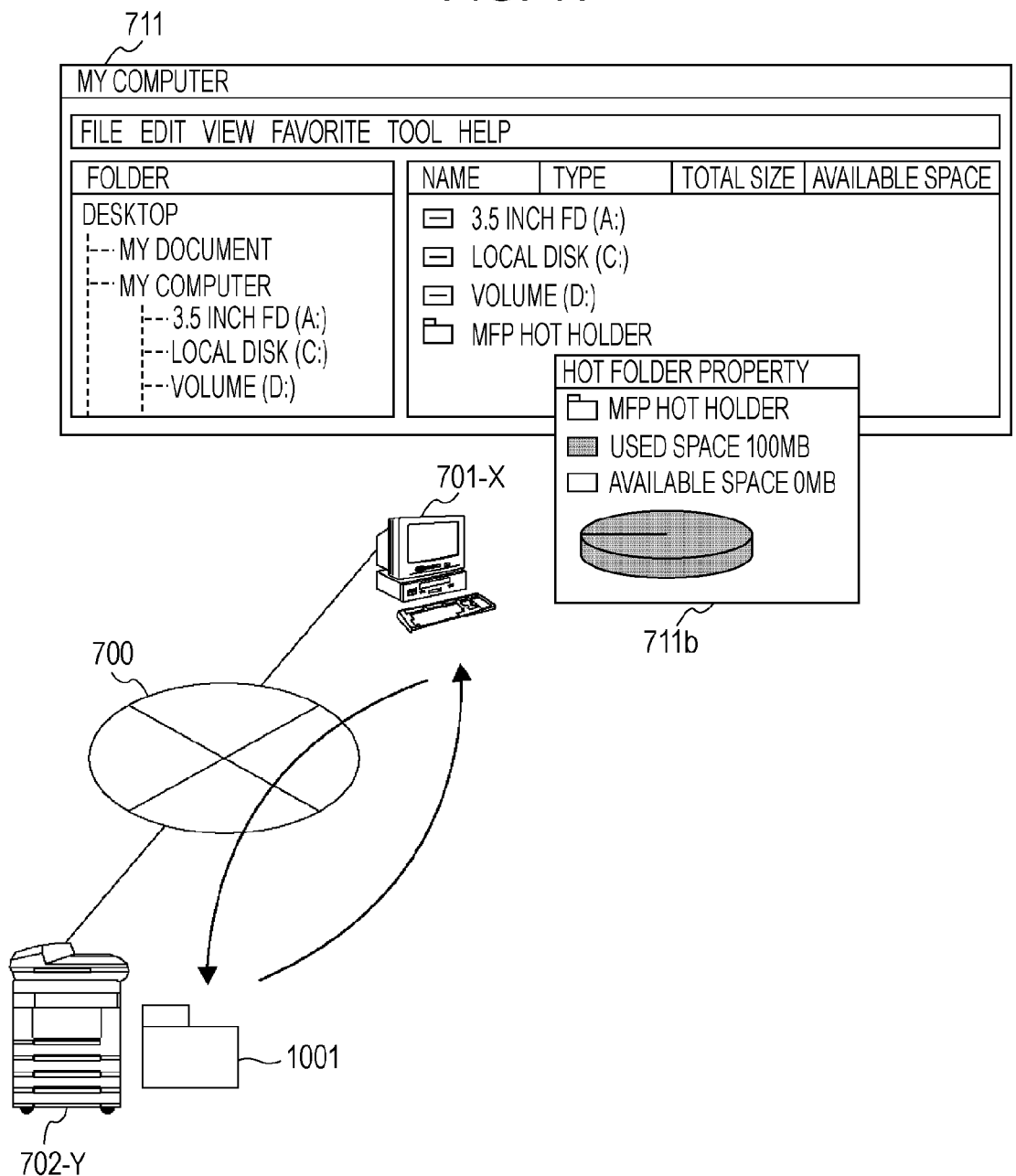
FIG. 11 is a diagram conceptually showing an example of a process of notifying property of a hot folder in a network system according to a modification of a second exemplary embodiment of the present invention.

With the above-described configuration, as shown in the example of FIG. 11, a dialog box 711b for showing the property of the hot folder is displayed on a screen of the CRT 806 of the information terminal 701-X.

As described above, it is possible to return the property of the hot folder 1001 to the information terminal 701-X in consideration for information regarding the function flow managing function in response to an inquiry about the property of the hot holder 1001 made using a general-purpose protocol. The property of the hot folder 1001 to be returned is not limited to a property indicating that a disk is full. The property may also be a property indicating that no access right is granted. In addition, the property may be a property based on one or more of the number of function flows activated in the digital multifunction peripheral 702-Y, the number of queuing documents included in the hot folder 1001, and the size of the used memory. Furthermore, the property may be combinations of at least two of the above-described properties.

According to one embodiment, units constituting the data processing apparatus and steps of the data processing method according to the above-described exemplary embodiments of the present invention can be realized, at least in part, by executing a program and/or computer-executable instructions stored in a computer-readable recording medium such as a RAM or a ROM of a computer. The computer-readable recording media storing the program and/or computer-executable instructions thus correspond to aspects of the present invention.

Aspects of the present invention can be embodied as, for example, at least one of a system, an apparatus, a method, and a recording medium. More specifically, aspects of the present invention may be applied to a system including a plurality of devices or an apparatus including a single device.

Computer-readable recording mediums having software programs and/or computer-executable instructions for realizing functions according to the above-described exemplary embodiments (e.g., processes corresponding to the flowcharts shown in FIGS. 6 and 10 according to the exemplary embodiments) may be supplied to the system or the apparatus directly or from a remote place. Aspects of the present invention also include such a case. A computer of the system or the apparatus may read out and execute the supplied program codes and/or computer-executable instructions, thereby achieving functions according to the above-described exemplary embodiments. Aspects of the present invention also include such a case.

Accordingly, in one aspect of the invention, program codes and/or computer-executable instructions may be installed in the computer to realize at least part of the functions according to the exemplary embodiments of the present invention.

In this case, the program and/or computer-executable instructions may be in any form, such as an object code, a program executed by an interpreter, or script data supplied to an OS.

Types of a recording medium for use in supplying the program and/or computer-executable instructions may include, for example, a flexible disk, a hard disk, an optical disc such as a CD-ROM, a CD-R, a CD-RW, or a DVD (DVD-ROM or DVD-R), a magneto-optical disk such as an MO, a magnetic tape, a nonvolatile memory card, and a ROM.

In addition, the program and/or computer-executable instructions may be supplied by a method that includes a case where a user accesses an Internet web site using a browser of a client computer and downloads the computer program and/or computer-executable instructions or a compressed file having an automatic installation function to a recording medium, such as a hard disk, from the web site.

In addition, the program codes and/or computer-executable instructions may be divided into a plurality of files and the plurality of files may be downloaded from different web sites. In this manner, functions according to the above-described exemplary embodiments can be realized. That is, aspects of the present invention may also include a WWW server that allows a plurality of users to download program files for realizing one or more functions according to exemplary embodiments of the present invention.

The program and/or computer-executable instructions according to aspects of the present invention may also be encrypted and recorded on a recording medium, such as a CD-ROM, and the recording medium may be distributed to users. In this case, users satisfying a predetermined condition may be permitted to download key information for decrypting the encryption from a web site via the Internet, execute the encrypted program and/or computer-executable instructions using the key information, and install the program and/or computer-executable instructions in a computer. In this manner, functions according to the above-described exemplary embodiments can be realized.

In addition to realization of at least part of the functions according to the above-described exemplary embodiments by the computer's execution of the read out program codes and/or computer-executable instructions, an operating system (OS) running on the computer may execute part of or all of actual processing on the basis of instructions of the program codes and/or computer-executable instructions, whereby functions according to the exemplary embodiments may be realized.

Furthermore, a program and/or computer-executable instructions read out from a recording medium may be written in a memory of a function expansion board inserted into the computer or a function expansion unit connected to the computer. A CPU or the like included in the function expansion board or the function expansion unit may execute part of or all of actual processing on the basis of instructions, thereby realizing functions according to the above-described exemplary embodiments.

Each of the above-described exemplary embodiments is only an example for carrying out the present invention. The technical scope of the present invention should not be limitedly interpreted by the exemplary embodiments. That is, the present invention can be carried out in various forms without departing from the technical spirit and features of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-126402 filed on May 13, 2008, which is hereby incorporated by reference herein in its entirety.

What is claimed is:

1. A data processing apparatus for executing, in response to a processing execution instruction transmitted from an information terminal to the data processing apparatus via a network, processing in accordance with the processing execution instruction, the data processing apparatus comprising:
 a monitoring unit configured to monitor and determine a storage of the processing execution instruction transmitted from the information terminal to the data processing apparatus via a network;
 a first determining unit configured to determine a protocol used in transmission of the processing execution instruction;
 a second determining unit configured to determine whether an error caused during execution of the processing is regarding a file-sharing function or a processing managing function;
 a converting unit configured to convert error information into the error information such that the error information is compliant with a general-purpose protocol for utilizing the file-sharing function and indicates that the storage of the processing execution instruction is not successful even if the storage of the processing execution instruction is successful, when the first determining unit determines the protocol is the general-purpose protocol for utilizing the file-sharing function and the second determining unit determines the error is regarding the processing managing function; and
 a transmitting unit configured to transmit the error information converted by the converting unit to the information terminal that has transmitted the processing execution instruction using the protocol used in transmission of the processing execution instruction.

2. The apparatus according to claim 1, further comprising:
 a storage area configured to store files, the storage area having the file-sharing function for allowing the files to be shared with the information terminal and the processing managing function for executing the processing in response to entry of a file in the storage area via communication using a dedicated protocol.

3. The apparatus according to claim 2, further comprising:
 an error determining unit configured to determine, when the error is caused during execution of the processing, whether the processing corresponding to the error is re-executable; and
 a processing re-executing unit configured to re-execute the processing when the error determining unit determines that the processing corresponding to the error is re-executable,
 wherein the converting unit converts the error information into error information compliant with the specification of the general-purpose protocol when the error determining unit determines that the processing corresponding to the error is not re-executable.

4. The apparatus according to claim 3, wherein the error determining unit determines whether the processing corresponding to the error is re-executable when the protocol determined by the protocol determining unit is the general-purpose protocol.

5. A data processing method for executing, in response to a processing execution instruction transmitted from an information terminal via a network, processing in accordance with the processing execution instruction, the data processing method comprising:
 monitoring and determining a storage of the processing execution instruction transmitted from the information terminal to the data processing apparatus via a network;
 determining a protocol used in transmission of the processing execution instruction;
 determining whether an error caused during execution of the processing is regarding a file-sharing function or a processing managing function;
 converting error information into the error information such that the error information is compliant with a general-purpose protocol for utilizing the file-sharing function and indicates that the storage of the processing execution instruction is not successful even if the storage of the processing execution instruction is successful, when the first determining unit determines the protocol is the general-purpose protocol for utilizing the file-sharing function and the second determining unit determines the error is regarding the processing managing function; and
 transmitting the converted error information to the information terminal that has transmitted the processing execution instruction using the protocol used in transmission of the processing execution instruction.

6. A non-transitory computer-readable recording medium storing a computer program for causing a data processing apparatus to execute a data processing method for executing, in response to a processing execution instruction transmitted from an information terminal via a network, processing in accordance with the processing execution instruction, the computer-readable recording medium comprising:
 computer-executable instructions for monitoring and determining a storage of the processing execution instruction transmitted from the information terminal to the date processing apparatus via a network;
 computer-executable instructions for determining a protocol used in transmission of the processing execution instruction;
 computer-executable instructions for converting error information into the error information such that the error information is compliant with a general-purpose protocol for utilizing the file-sharing function and indicates that the storage of the processing execution instruction is not successful even if the storage of the processing execution instruction is successful, when the first determining unit determines the protocol is the general-purpose protocol for utilizing the file-sharing function and the second determining unit determines the error is regarding the processing managing function; and
 computer-executable instructions for transmitting the converted error information to the information terminal that has transmitted the processing execution instruction using the protocol used in transmission of the processing execution instruction.

7. The apparatus according to claim 1, wherein
 the error information which is compliant with the general purpose protocol for utilizing the file-sharing function indicates any one of an insufficient storage, a bad request, and unauthorized.

8. The method according to claim 5, wherein
the error information which is compliant with the general purpose protocol for utilizing the file-sharing function indicates any one of an insufficient storage, a bad request, and unauthorized.

9. The non-transitory computer-readable recording medium method according to claim 6, wherein
the error information which is compliant with the general purpose protocol for utilizing the file-sharing function indicates any one of an insufficient storage, a bad request, and unauthorized.

* * * * *